United States Patent
Valiyaparambil et al.

(10) Patent No.: US 9,063,822 B2
(45) Date of Patent: Jun. 23, 2015

(54) EFFICIENT APPLICATION-AWARE DISASTER RECOVERY

(75) Inventors: Manoj K. Valiyaparambil, Andhra Pradesh (IN); Amit Singla, Redmond, WA (US); Vijay Sen, Redmond, WA (US); Abid Ali, Andhra Pradesh (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 697 days.

(21) Appl. No.: 13/224,794

(22) Filed: Sep. 2, 2011

(65) Prior Publication Data

US 2013/0061089 A1  Mar. 7, 2013

(51) Int. Cl.
*G06F 11/00* (2006.01)
*G06F 9/44* (2006.01)
*G06F 11/14* (2006.01)

(52) U.S. Cl.
CPC .............. *G06F 8/68* (2013.01); *G06F 11/1451* (2013.01); *G06F 11/1453* (2013.01); *G06F 11/1464* (2013.01); *G06F 11/1469* (2013.01); *G06F 2201/815* (2013.01)

(58) Field of Classification Search
CPC .............. G06F 11/1451; G06F 3/0619; G06F 11/1448; G06F 11/1004; G06F 11/1456; G06F 11/2094; G06F 17/30097; G06F 11/1446; G06F 11/1458; G06F 11/1469
USPC .......................................................... 714/15
See application file for complete search history.

(56) References Cited

U.S. PATENT DOCUMENTS 7,134,041 B2 * 11/2006 Murray et al. ................. 714/4.1
7,480,827 B2 * 1/2009 Callaway et al. ............. 714/6.3
7,552,358 B1 6/2009 Asgar-Deen et al.
7,752,487 B1 * 7/2010 Feeser et al. ................. 714/4.11
7,761,456 B1 * 7/2010 Cram et al. ................... 707/754

(Continued)

FOREIGN PATENT DOCUMENTS

CN 101243413 A 8/2008
CN 101460934 A 6/2009

(Continued)

OTHER PUBLICATIONS

Mark Bowker, et al., Accelerating Virtualization Adoption with Application Awareness, Aug. 2009, (10 pages).

(Continued)

*Primary Examiner* — Bryce Bonzo
*Assistant Examiner* — Elmira Mehrmanesh
(74) *Attorney, Agent, or Firm* — Henry Gabryjelski; Dolan Stein; Micky Minhas (57) ABSTRACT

Embodiments are directed to efficiently backing up portions of data and to performing a scoped data recovery. In an embodiment, a computer system preloads data images with data corresponding to various different software applications or operating systems. The computer system chunks the data images, so that each data image is divided into multiple data chunks, and where each data chunk is represented by a hash value. The computer system then receives, from a user, portions of delta data representing data differences between the received user data and the data in the preloaded data images. The computer system also generates a logical backup representation that includes the data chunk hash values for the preloaded data images as well as the delta data received from the user. This logical representation allows restoration of the user's data using only the hash values and the delta data.

20 Claims, 4 Drawing Sheets

(56) References Cited

U.S. PATENT DOCUMENTS

| | | | |
|---|---|---|---|
| 7,788,220 B1 | 8/2010 | Auchmoody et al. | |
| 7,860,843 B2 * | 12/2010 | Dodd et al. | 707/693 |
| 7,933,987 B2 | 4/2011 | Aidun et al. | |
| 8,060,476 B1 * | 11/2011 | Afonso et al. | 707/649 |
| 8,370,679 B1 | 2/2013 | Gawali et al. | 714/3 |
| 8,386,430 B1 * | 2/2013 | Myhill et al. | 707/640 |
| 8,452,731 B2 * | 5/2013 | Preslan et al. | 707/652 |
| 2002/0107877 A1 * | 8/2002 | Whiting et al. | 707/204 |
| 2004/0199812 A1 * | 10/2004 | Earl et al. | 714/13 |
| 2005/0193245 A1 * | 9/2005 | Hayden et al. | 714/13 |
| 2005/0216788 A1 * | 9/2005 | Mani-Meitav et al. | 714/6 |
| 2007/0186127 A1 * | 8/2007 | Desai et al. | 714/13 |
| 2007/0208918 A1 * | 9/2007 | Harbin et al. | 711/162 |
| 2007/0276885 A1 | 11/2007 | Baliyaparambil et al. | |
| 2008/0229142 A1 * | 9/2008 | Anand et al. | 714/4 |
| 2009/0228453 A1 | 9/2009 | Hirsch et al. | |
| 2010/0318759 A1 * | 12/2010 | Hamilton et al. | 711/171 |
| 2011/0106768 A1 | 5/2011 | Khanzode et al. | |

FOREIGN PATENT DOCUMENTS

| | | | |
|---|---|---|---|
| WO | 2008003026 A2 | 1/2008 | |
| WO | 2011053450 A2 | 5/2011 | |

OTHER PUBLICATIONS

Hitachi Dynamic Replicator Software, Hitachi Data systems, Dec. 2009, (12 pages).

How to Implement a Disaster Recovery Plan for SMBs with SnapServer SAN S2000, 2010, Overland Storage, (3 pages).

iProtect Proud Backup & Recovery Appliance, 2011, Jun. 7, 2011 (Retrieved Date), http://www.iprotectproud.com/backuprecovery_features.php, (1 page).

What's New in Veeam Backup & Replication v5, Veeam, Nov. 7, 2011, (5 pages).

A Cost-Effective Integrated Solution for Backup and Disaster Recovery, Nov. 19, 2009, (7 pages).

Laura Dubois et al., "Backup and Recovery: Accelerating Efficiency and Driving Down IT Costs Using Data Deduplication", IDS #221849, Feb. 2010. Retrieved from the Internet: <URL: http://www.bltrading.com/pdf/featuredwp/idc.pdf>.

First Office Action received in Chinese Patent Application No. 201210320086.7, Mailed Date: Aug. 5, 2014, 16 pages.

"Supplementary Search Report Issued in European Patent Application No. 12826825.7", Mailed Date: Mar. 17, 2015, 7 Pages.

\* cited by examiner

EFFICIENT APPLICATION-AWARE DISASTER RECOVERY

BACKGROUND

Computers have become highly integrated in the workforce, in the home, in mobile devices, and many other places. Computers can process massive amounts of information quickly and efficiently. Software applications designed to run on computer systems allow users to perform a wide variety of functions including business applications, schoolwork, entertainment and more. Software applications are often designed to perform specific tasks, such as word processor applications for drafting documents, or email programs for sending, receiving and organizing email.

The data produced by these applications is often very valuable and, hence, is typically backed up in some form. Data backup applications may come in many different forms. Some backup applications back the data up locally on a tape drive or other media. Other backup applications back the data up in remote locations, including on the cloud. In addition to regular data backups, businesses may have disaster protection plans in place which are enacted in the case of an emergency. These data recovery plans, however, typically use a great deal of network bandwidth, as implementation of these plans tends to be all or nothing.

BRIEF SUMMARY

Embodiments described herein are directed to efficiently backing up one or more portions of data and to performing a scoped data recovery. In one embodiment, a computer system preloads data images with data corresponding to various different software applications or operating systems. The computer system chunks the preloaded data images, so that each data image is divided into multiple data chunks, and where each data chunk is represented by a hash value. The computer system then receives from a user portions of delta data representing data differences between the received user data and the data in the preloaded data images. The computer system also generates a logical backup representation that includes the data chunk hash values for the preloaded data images as well as the delta data received from the user. This logical representation allows restoration of the user's data using only the hash values and the delta data.

In another embodiment, a computer system defines a disaster recovery policy that specifies which software applications among multiple different software applications is to be restored after a disastrous event has occurred. The computer system receives, from a generated virtual hard disk, difference data comprising data differences between data received from a user and other preloaded data images, where the virtual hard disk is configured to receive the difference data from the user. The computer system determines, based on the disaster recovery policy, which software application's data is to be restored and restores the software application delta data to the user according to the policy.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Embodiments described herein are directed to efficiently backing up portions of data and to performing a scoped data recovery. In one embodiment, a computer system preloads data images with data corresponding to various different software applications or operating systems. The computer system chunks the preloaded data images, so that each data image is divided into multiple data chunks, and where each data chunk is represented by a hash value. The computer system then receives from a user portions of delta data representing data differences between the received user data and the data in the preloaded data images. The computer system also generates a logical backup representation that includes the data chunk hash values for the preloaded data images as well as the delta data received from the user. This logical representation allows restoration of the user's data using the hash values and the delta data. For instance, once the hash value has been mapped to the appropriate data chunk, the delta data may be used to represent a complete view of the restored data.

In another embodiment, a computer system defines a disaster recovery policy that specifies which software applications among multiple different software applications is to be restored after a disastrous event has occurred. The computer system receives, from a generated virtual hard disk, difference data comprising data differences between data received from a user and other preloaded data images. The computer system determines, based on the disaster recovery policy, which software application's data is to be restored and restores the software application delta data to the user according to the policy.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions in the form of data are computer storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM, solid state drives (SSDs) that are based on RAM, Flash memory, phase-change memory (PCM), or other types of memory, or other optical disk storage, magnetic disk storage or other magnetic storage devices, or any other medium which can be used to store desired program code means in the form of computer-executable instructions, data or data structures and which can be accessed by a general purpose or special purpose computer.

A "network" is defined as one or more data links and/or data switches that enable the transport of electronic data between computer systems and/or modules and/or other electronic devices. When information is transferred or provided over a network (either hardwired, wireless, or a combination of hardwired or wireless) to a computer, the computer properly views the connection as a transmission medium. Transmissions media can include a network which can be used to carry data or desired program code means in the form of computer-executable instructions or in the form of data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC"), and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems that are linked (either by hardwired data links, wireless data links, or by a combination of hardwired and wireless data links) through a network, each perform tasks (e.g. cloud computing, cloud services and the like). In a distributed system environment, program modules may be located in both local and remote memory storage devices.

Figure 1:
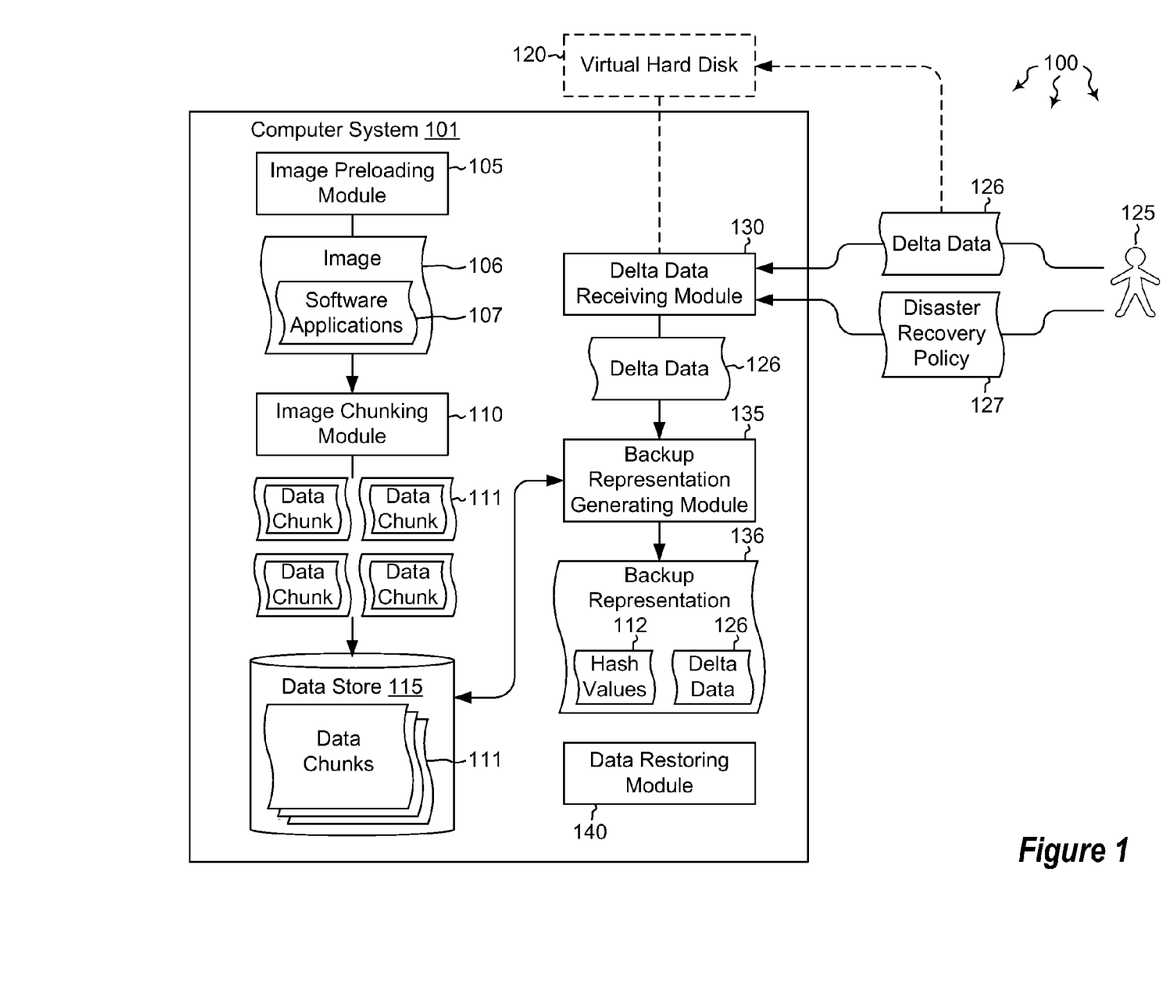
FIG. 1 illustrates a computer architecture in which embodiments of the present invention may operate including efficiently backing up one or more portions of data.

FIG. 1 illustrates a computer architecture 100 in which the principles of the present invention may be employed. Computer architecture 100 includes a computer system 101. The computer system may be any type of local or distributed computer system. System 101 may be configured to perform various embodiments including 1) optimizing resource utilization when setting up a secondary site for disaster protection and 2) performing application aware scoped disaster protection and recovery. Each of these aspects will be preliminarily described below, and further with regard to methods 200 and 300 of FIGS. 2 and 3, respectively.

In order to have a secondary location (cloud or otherwise) be able to host an operating system (OS), applications and corresponding data, with a reasonable recovery time (in case of a disaster), the OS and application data are made available at the secondary location, which is kept in sync with a primary location. In some cases the application/OS data may be stored in a virtual hard disk (VHD). Many other storage devices may be used in addition to or as an alternative to a VHD. Moreover, the approach described below is designed to work across physical and virtual deployments.

In some embodiments, "golden images" may be created for OSs and/or applications. As used herein, the term "golden images" may refer to data images that include pre-installed versions of an operating system and one or more software programs. Embodiments may leverage these golden images for optimally setting up disaster recovery. As a setup step, the secondary (backup) location is seeded with a library of golden images. These images may be standard OS and application binaries directly loaded on the secondary location without needing to seed over the network. In one example, an updated golden image may include the set of changes that helps the system synthesize a different golden image as compared to an original golden image. In the context of this example, the updated golden image may be stored on a differencing VHD (designed to store the differences between images) that can combine with the original golden image to provide a newer flavor of the golden image without requiring multiple times the storage.

The golden images may be stored in a library and then chunked at a block level using (at least in some cases) variable chunking. Chunking divides the images into multiple different "chunks", where each chunk is represented by a unique identifier (e.g. a hash value). The golden images may be retained post chunking in order to facilitate a faster recovery in case of disasters if desired, but this will require extra storage. If storage is to be conserved, the golden images may be discarded post chunking and re-synthesized from the chunks, along with metadata stored with the chunks that indicates how the chunks are to be re-formed into an image.

Once the chunks are generated from the golden images (chunking process is required only when new images are seeded into the library), the source data is streamed into a VHD and this is compared against the blocks generated previously by chunking all the golden images. Due to the commonality between the golden image files (e.g. OS binaries, application binaries), large chunks of data will be readily available on the secondary location, and the time taken (and resources consumed) to transmit only new blocks to the secondary will be more efficient (and faster) than transmitting the entire streamed VHD from primary source to the secondary.

It should also be noted that should the golden image be retained on the secondary (for speedy disaster recovery), the golden image may not be directly updated by the changes from the source system. Rather, a differencing VHD may be used to capture the required changes in order to synthesize the source system from the golden image. A logical grouping may be created to keep track of this relationship.

Once the logical grouping exists, a variety of options may be available to perform a data recovery (after a disaster): 1) One option would be to directly 'recover' an instance of the source system in the secondary location by using the logical group relationship. Recovery here could be performed by directly launching an instance of the OS and/or application data contained within the logical grouping; or, alternatively, by copying the logical grouping to another area in the secondary location itself and then instantiating it. 2) A second option would be to use the golden image (when available in the primary location) to bring up the source system. Once this is done, only the differencing information (e.g. from the differencing VHD) will need to be streamed across to fix up the source system. This approach may also be used during failback once the primary resources have come online after a disaster.

Embodiments may also be directed to application aware scoped disaster protection and recovery. In some cases, businesses may have a core set of applications that are more important to them than other applications (e.g. email management programs). After a disaster, such businesses may want to use their available resources (e.g. storage, network bandwidth between primary and secondary) to restore these important applications before restoring other, less important applications. Thus, in some embodiments, a scoped backup and/or restore may be provided for each application.

As a first step in the workflow, the policy for scoping of the application and data needed to be provided (or automatically detected based on classification metadata). Based on the scope provided, the scoped streamed VHD is generated and fixed up using the chunks generated from the golden images. Once the fixup is completed, the logical representation for the scoped source system is determined.

Scoping can be done at application level or at a component level (e.g. restoring certain portions of applications). One way to determine the application boundaries and components would be to use an application writer (or system writer for system files). Once the scoping is done, a streaming VHD can be set up for the desired scope and then used for the backup or the disaster recovery. In addition, the streamed backup VHD can be further scoped during the disaster recovery process to enable disaster recovery for a subset of applications that were originally backed up. Since the backup is aware of the application and components, it has the required information to enable only a subset of these to be used for the disaster recovery. In this way, businesses or other users can also backup all their applications and components, but perform disaster recovery only for a subset of the application and components. Leveraging the backup assets to perform disaster recovery may avoid storing duplicate data. These aspects will be described in greater detail below with regard to methods 200 and 300 of FIGS. 2 and 3, respectively.

Figure 2:
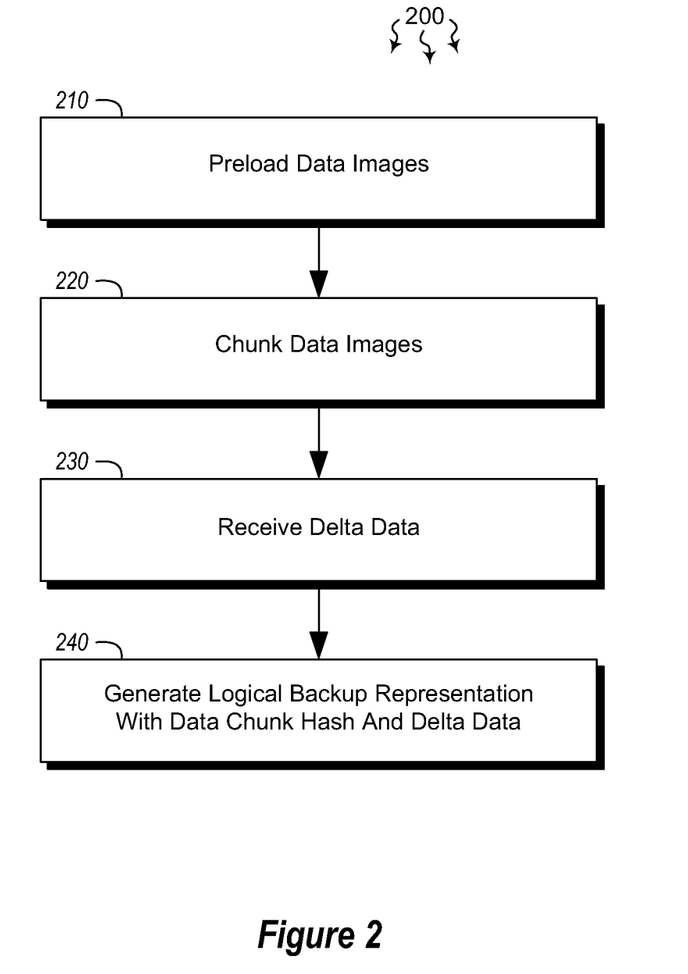
FIG. 2 illustrates a flowchart of an example method for efficiently backing up one or more portions of data.
Figure 3:
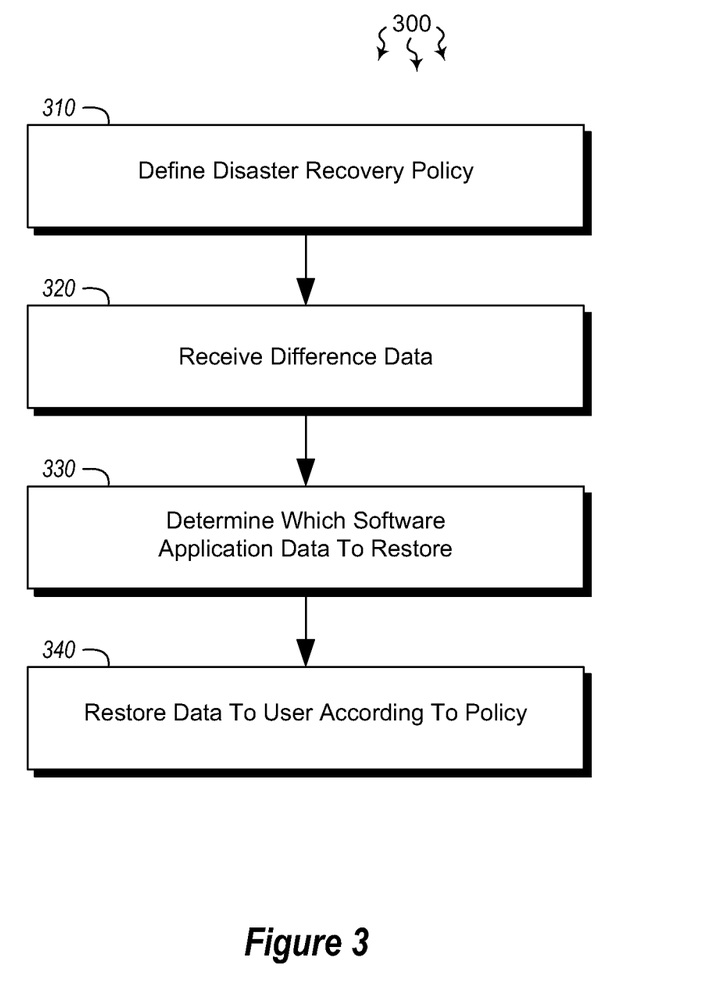
FIG. 3 illustrates a flowchart of an example method for performing a scoped data recovery.

In view of the systems and architectures described above, methodologies that may be implemented in accordance with the disclosed subject matter will be better appreciated with reference to the flow charts of FIGS. 2 and 3. For purposes of simplicity of explanation, the methodologies are shown and described as a series of blocks. However, it should be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 2 illustrates a flowchart of a method 200 for efficiently backing up one or more portions of data. The method 200 will now be described with frequent reference to the components and data of environment 100.

Method 200 includes an act of preloading one or more data images with data corresponding to one or more software applications (act 210). For example, image preloading module 105 may preload (golden) image 106 that includes applications and/or operating systems. For instance, the golden image may include a version of an operating system, a patched or updated version of an operating system, an operating system plus one or more applications, or simply an application or set of applications (e.g. an office software suite) (any or all of these combinations may be represented by element 107). These images, once preloaded, may be chunked by image chunking module 110. Each data image is thus divided into multiple different data chunks 111 and each of those data chunks is represented by a hash value 112 (act 220). The hash value may be generated by MD5 or substantially any other hashing algorithm. The data chunks may be stored in a data store 115. The data store may include any type of local or distributed data storage. The data store may also store the preloaded (golden) data images 106.

Method 200 also includes an act of receiving, from a user, one or more portions of delta data representing data differences between the received user data and the data in the preloaded data images (act 230). For example, delta data receiving module 130 may receive delta data 126 from user 125. The delta data represents data differences between the user's data and the data in the preloaded images 106. Thus, if a user has created content, or add-ons to different applications, these portions of data will be included in the delta data. Moreover, any settings or policy changes will be sent in the delta data. In general, the delta data will include any data changes after the initial software application- or operating system's installation.

Method 200 further includes an act of generating a logical backup representation that includes the data chunk hash values for the preloaded data images as well as the delta data received from the user, wherein the logical representation allows restoration of the user's data using the hash values to reference the appropriate chunks and the delta data (act 240). For example, backup representation generating module 135 may generate logical backup representation 136 which includes the hash values 112 of the chunked images and the delta data 126 received from user 125. After a disaster, a user may restore their data using the preloaded images (or simply installing the application/OS themselves, and the delta data. The logical backup representation may thus only include the hash values and delta data.

Accordingly, in one embodiment, the computer system 101 may receive a request to restore the user's data. The request includes an indication of those operating systems and programs that are already installed on the user's computer system. The computer system may then access the logical backup representation 136 to determine which data is to be returned to restore the user's computer system to its original state. Additionally or alternatively, the data may be returned to recreate the backed-up computer system on a different target such as another computer system or to the cloud. Then, upon determining which data to return, the computer system may return that data to the user.

In some cases, the logical backup representations are generated for those software applications specified by the user. In this manner, the disaster recovery is scoped to include only those applications desired by the user. These applications may include applications deemed as high-priority by the user. These high-priority applications may be restored before data of lower-priority applications. The priority of the applications may be stored in disaster recovery policy 127. The user may, in some cases, request that one or more preloaded images be returned in addition to the delta data. In such cases, the determined preloaded images may be sent in addition to the delta data. Additionally or alternatively, one or more of the user's applications may be restored locally on a local computer system, such that the applications are provided to application users from the local computer system.

FIG. 3 illustrates a flowchart of a method 300 for performing a scoped data recovery. The method 300 will now be described with frequent reference to the components and data of environments 100 and 400 of FIGS. 1 and 4, respectively.

Figure 4:
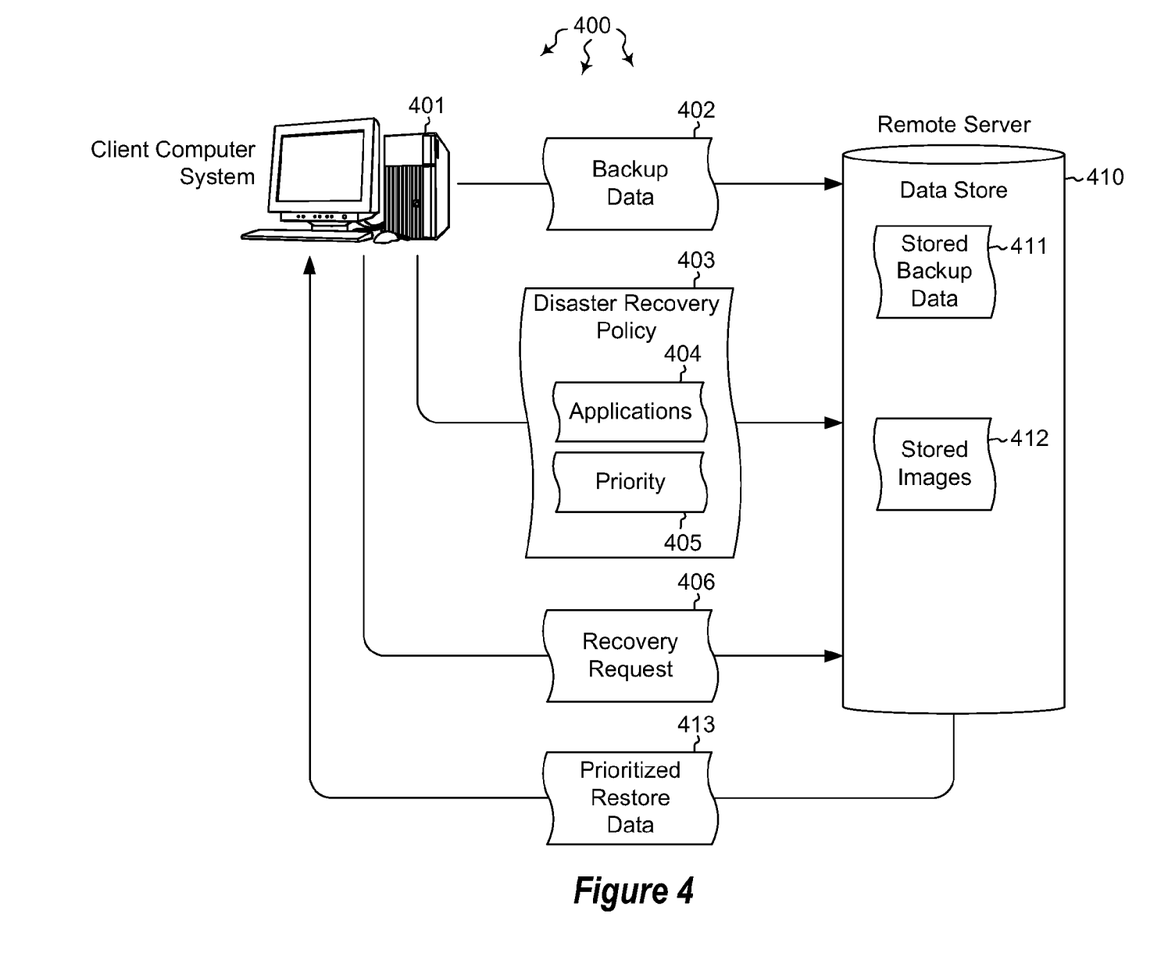
FIG. 4 illustrates a computer architecture in which data is restored in a prioritized manner.

Method 300 includes an act of defining a disaster recovery policy that specifies which software applications among a plurality of different software applications is to be restored after a disastrous event has occurred (act 310). For example, a user at client computer system 401 may define disaster recovery policy 403 which specifies which software applications 404 are to be restored after a disastrous event has occurred and the user's computer systems are no longer available.

The disaster recovery policy may specify that all or a portion of the user's data is to be backed up (e.g. in remote server data store 410). After the disaster, all or a portion of the user's data 411/412 may be restored. Specifically, the user may specify that all of their backed up applications are to be restored, or may specify that certain applications among their complete set of backed up applications are to be restored. The disaster recovery policy may further specify a priority 405 for each application. In such cases, higher-priority applications are restored before lower priority applications. In cases where portions of a single application are restored, those portions may also be prioritized so that high-priority application portions are restored first.

Method 300 includes an act of receiving, from a generated virtual hard disk, difference data comprising data differences between data received from a user and one or more preloaded data images, the virtual hard disk being configured to receive the difference data from the user (act 320). For example, user 125 may send their delta data to a virtual hard drive 120. The virtual hard drive receives and stores this delta data. The user may send a recovery request 406 to the remote server to restore the user's data according to the disaster recovery policy. In some cases, a logical backup representation may be generated that includes the data hash values for the preloaded data images as well as the difference data received from the user. The logical representation allows restoration of the user's data using only the hash values to reference the appropriate data chunks and the difference data. The remote server may determine, based on the disaster recovery policy, which software application's data is to be restored (act 330). Then, according to the policy, the user's data may be restored (act 340). Because the data is restored from previously stored backup data, the storage of separate data for disaster recovery is avoided.

Accordingly, methods, systems and computer program products are provided which efficiently back up one or more portions of data. Moreover, methods, systems and computer program products are provided which perform a scoped data recovery.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. At a computer system including at least one processor and a memory, in a computer networking environment including a plurality of computing systems, a computer-implemented method for efficiently backing up one or more portions of data, the method comprising:
    an act of preloading one or more data images configured for implementation in data backups for a plurality of users, the data images comprising data corresponding to one or more software applications or operating systems;
    an act of chunking the preloaded data images, such that each data image is divided into a plurality of data chunks, each data chunk being represented by a hash value;
    an act of receiving, from a first user, one or more portions of delta data representing data differences between the first user's data and the data in the preloaded data images; and
    an act of generating a logical backup representation that represents a backup of the first user's data, the logical backup representation including the data chunk hash values for the preloaded data images and the delta data received from the user, wherein the logical representation allows restoration of the first user's data using the hash values to access the chunked preloaded data images and the delta data.

2. The method of claim 1, wherein only the hash values and delta data are stored as part of the logical backup representation.

3. The method of claim 1, further comprising receiving delta data from a second user and generating a second logical backup representation that allows restoration of the second user's data using the hash values to access the chunked preloaded data images and the second user's delta data.

4. The method of claim 1, further comprising:
    an act of receiving a request to restore the user's data, wherein the request includes an indication of those operating systems and programs that are already installed on the user's computer system;
    an act of accessing the logical backup representation to determine which data is to be returned to restore the user's computer system to its original state; and
    an act of returning the determined data to the user.

5. The method of claim 4, wherein the delta data includes one or more of the following: software programs, software program settings, user-generated data and operating system settings.

6. The method of claim 4, wherein data for designated high-priority applications is restored before data for designated lower-priority applications.

7. The method of claim 4, further comprising:
an act of determining that one or more preloaded images are to be returned in addition to the delta data; and
an act of sending the determined preloaded images in addition to the delta data.

8. The method of claim 4, wherein one or more of user's applications are restored locally on the user's local computer system, such that the applications are provided to application users from the local computer system.

9. The method of claim 1, wherein the logical backup representations are generated for those software applications specified by the user.

10. A computer program product for implementing a method for performing a scoped data recovery, the computer program product comprising one or more computer-readable storage media having stored thereon computer-executable instructions that, when executed by one or more processors of the computing system, cause the computing system to perform the method, the method comprising:
an act of defining a disaster recovery policy that identifies a logical backup representation which specifies one or more software applications among a plurality of different software applications or operating systems that are to be restored after a disastrous event has occurred, the logical backup representation including data chunk hash values for preloaded data images and difference data;
an act of receiving, from a generated virtual hard disk, difference data comprising data differences between data received from a user and one or more preloaded data images, the virtual hard disk being configured to receive the difference data from the user;
an act of determining, based on the disaster recovery policy, which software application's data is to be restored; and
an act of restoring the software application delta data to the user according to the policy.

11. The computer program product of claim 10, wherein the data is restored from previously stored backup data, such that supplemental storage for disaster recovery is avoided.

12. The computer program product of claim 10, wherein the disaster recovery policy specifies that all of the user's data is to be backed up, and wherein all of the user's data is restored after the disastrous event.

13. The computer program product of claim 10, wherein the disaster recovery policy specifies that all of the user's data is to be backed up, and wherein a specified subset of applications is restored after the disastrous event.

14. The computer program product of claim 10, wherein the disaster recovery policy specifies that a specified subset of applications is to be backed up, and wherein a further subset of the subset of applications is restored after the disastrous event.

15. The computer program product of claim 14, wherein the further subset comprises high-priority applications selected by the user.

16. The computer program product of claim 14, wherein the further subset comprises one or more portions of a single application selected by the user.

17. The computer program product of claim 10, further comprising generating and storing the logical backup representation that includes the data hash values for the preloaded data images as well as the difference data received from the user.

18. The computer program product of claim 17, wherein the logical representation allows restoration of the user's data using only the hash values and the difference data.

19. A computer system comprising the following:
one or more processors;
system memory;
one or more computer-readable storage media having stored thereon computer-executable instructions that, when executed by the one or more processors, causes the computing system to perform a method for performing a scoped data recovery, the method comprising the following:
an act of defining a disaster recovery policy that identifies a logical backup representation which specifies one or more software applications among a plurality of different software applications or operating systems that are to be restored after a disastrous event has occurred, the logical backup representation including data chunk hash values for preloaded data images and difference data;
an act of receiving, from a generated virtual hard disk, difference data comprising data differences between data received from a user and one or more preloaded data images, the virtual hard disk being configured to receive the difference data from the user, the preloaded data images comprising one or more portions of an existing data backup in which the user's data has been backed up in full;
an act of determining, based on the disaster recovery policy, which software application's data among the existing backup data is to be restored; and
an act of restoring the software application delta data for the specified applications to the user according to the policy.

20. The system of claim 19, further comprising:
an act of determining that one or more preloaded images are to be returned in addition to the software application delta data; and
an act of sending the determined preloaded images in addition to the software application delta data.

* * * * *